US007539509B2

(12) United States Patent
Bauman et al.

(10) Patent No.: US 7,539,509 B2
(45) **Date of Patent: *May 26, 2009**

(54) SMALL SIGNAL THRESHOLD AND PROPORTIONAL GAIN DISTRIBUTED DIGITAL COMMUNICATIONS

(75) Inventors: Donald R. Bauman, Waseca, MN (US); Philip M. Wala, Waseca, MN (US); Jerry Edward Toms, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 169 days.

This patent is subject to a terminal disclaimer.

(21) Appl. No.: 11/469,623

(22) Filed: Sep. 1, 2006

(65) Prior Publication Data

US 2007/0064506 A1 Mar. 22, 2007

Related U.S. Application Data

(63) Continuation of application No. 10/414,907, filed on Apr. 16, 2003, now Pat. No. 7,103,377.

(60) Provisional application No. 60/430,435, filed on Dec. 3, 2002.

(51) Int. Cl.
*H04B 7/00* (2006.01)
*H04B 1/06* (2006.01)

(52) U.S. Cl. ................ 455/522; 455/562.1; 455/127.2; 455/249.1; 455/250.1

(58) Field of Classification Search ................ 455/522, 455/561, 562.1, 127.2, 127.3, 232.1, 234.1, 455/245.2, 249.1, 250.1; 375/345
See application file for complete search history.

(56) References Cited

U.S. PATENT DOCUMENTS

| | | | |
|---|---|---|---|
| 4,144,411 | A | 3/1979 | Frenkiel |
| 4,451,699 | A | 5/1984 | Gruenberg |
| 4,475,010 | A | 10/1984 | Huensch et al. |
| 4,485,486 | A | 11/1984 | Webb et al. |
| 4,556,760 | A | 12/1985 | Goldman |

(Continued)

FOREIGN PATENT DOCUMENTS

| | | |
|---|---|---|
| EP | 0346925 | 12/1989 |
| EP | 0368673 | 5/1990 |
| EP | 0468688 | 1/1992 |
| FR | 2345865 | 10/1977 |
| WO | 9115927 | 10/1991 |

OTHER PUBLICATIONS

Wala, "A new Microcell Architecture Using Digital Optical Transport", 43rd IEEE Vehicular Technology Conference, Personal Communication—Freedom Through Wireless Technology, May 18-20, 1993, pp. 585-588, Publisher: IEEE.

(Continued)

*Primary Examiner*—Nguyen Vo
(74) *Attorney, Agent, or Firm*—Fogg & Powers LLC

(57) ABSTRACT

An apparatus for gain distribution in a system comprising a plurality of distributed antennas and a total system dynamic range is disclosed. The apparatus includes means for sensing a signal level at each of the plurality of distributed antennas, means for comparing at least one of the plurality of signal levels with a dynamic range fair share threshold, and means for attenuating each of the at least one of the compared signal levels that is greater than the dynamic range fair share threshold with a gain factor that is determined in response to a remaining portion of the total system dynamic range after attenuation of other signal levels of the plurality of signal levels.

20 Claims, 11 Drawing Sheets

U.S. PATENT DOCUMENTS

| | | | | |
|---|---|---|---|---|
| 4,611,323 | A | 9/1986 | Hessenmuller | |
| 4,612,990 | A | 9/1986 | Shu | |
| 4,628,501 | A | 12/1986 | Loscoe | |
| 4,654,843 | A | 3/1987 | Roza et al. | |
| 4,691,292 | A | 9/1987 | Rothweiler | |
| 4,813,054 | A | 3/1989 | Plumb | |
| 4,849,963 | A | 7/1989 | Kawano et al. | |
| 4,916,460 | A | 4/1990 | Powell | |
| 4,999,831 | A | 3/1991 | Grace | |
| 5,067,173 | A | 11/1991 | Gordon et al. | |
| 5,278,690 | A | 1/1994 | Vella-Coleiro | |
| 5,321,849 | A | 6/1994 | Lemson | |
| 5,621,786 | A | 4/1997 | Fischer et al. | |
| 5,627,879 | A | 5/1997 | Russell et al. | |
| 5,642,405 | A | 6/1997 | Fischer et al. | |
| 5,644,622 | A | 7/1997 | Russell et al. | |
| 5,657,374 | A | 8/1997 | Russell et al. | |
| 5,765,099 | A | 6/1998 | Georges et al. | |
| 5,774,085 | A | 6/1998 | Yanagimoto et al. | |
| 5,774,789 | A | 6/1998 | Van Der Kaay et al. | |
| 5,802,173 | A | 9/1998 | Hamilton-Piercy et al. | |
| 5,809,395 | A | 9/1998 | Hamilton-Piercy et al. | |
| 5,852,651 | A | 12/1998 | Fischer et al. | |
| 5,969,837 | A | 10/1999 | Farber et al. | |
| 6,112,086 | A | 8/2000 | Wala | |
| 6,122,529 | A | 9/2000 | Sabat, Jr. et al. | |
| 6,128,470 | A | 10/2000 | Naidu et al. | |
| 6,223,021 | B1 | 4/2001 | Silvia et al. | |
| 6,308,085 | B1 | 10/2001 | Shoki | |
| 6,349,200 | B1 | 2/2002 | Sabat, Jr. et al. | |
| 6,580,905 | B1 | 6/2003 | Naidu et al. | |
| 6,643,498 | B1 | 11/2003 | Miyajima | |
| 7,103,377 | B2 * | 9/2006 | Bauman et al. | 455/522 |
| 2001/0031014 | A1 | 10/2001 | Subramanian et al. | |
| 2003/0133182 | A1 | 7/2003 | Ng et al. | |
| 2003/0162516 | A1 | 8/2003 | Solum | |
| 2004/0203339 | A1 | 10/2004 | Bauman | |

OTHER PUBLICATIONS

Merrett et al., "A Cordless Access System Using Radio-Over-Fibre Techniques", 41st IEEE Vehicular Technology Conference Gateway to the Future Technology in Motion, May 19, 1991, pp. 921-924, Published in: St. Louis, MO.

Lee et al., "Intelligent Microcell Applications in PCS", 43rd IEEE Vehicular Technology Conference, Personal Communication—Freedom Through Wireless Technology, May 18, 1993, pp. 722-725, Publisher: IEEE.

ADC Kentrox, "ADC Kentrox Introduces Innovative Wireless Network Access Solution Cellular Subscribers Offered a New Level of Portable", Mar. 1, 1993, pp. 1-3, Publisher: ADC Kentrox, Published in: Portland, OR.

"ADC Kentrox Wireless Systems Group Citycell 824—A Positioning White Paper", Mar. 1993, Publisher: CITA Trade Show.

"And Now a Few Words From Your Customers", Aug. 1992, pp. 1-4, Publisher: ADC Kentrox, Published in: Portaland,OR.

"ADC Kentrox Introduces Citycell 824, A Replacement for Conventional Cell Sites; Company's Original Goal was to Improve Fiber Optic T1 Links Between Cells, MTSOs", "Telocator Bulletin", Feb. 1993.

Tang, "Fiber Optic Antenna Remoting for Multi-Sector Cellular Cell Sites", GTE Laboratories—Abstract, Jun. 14-18, 1992.

ADC Kentrox, "First Field Trial Results Exceed Expectations ADC Kentrox and Cellular One Join Force to Provide a New Level of Portable", Mar. 2, 1993, pp. 1-2, Publisher: ADC Kentrox, Published in: Portland, OR.

Steele, "Towards a High-Capacity Digital Cellular Mobile Radio System", IEEE Proceedings-F Special Issue on Land Mobile Radio, Aug. 1985, pp. 405-415, vol. 132, PT F, No. 5, Publisher: IEEE.

Akos et al., "Direct Bandpass Sampling of Multiple Distinct RF Signals", IEEE Transactions on Communications, Jul. 1999, pp. 983-988, vol. 47, No. 7.

Foxcom Wireless Properietary Information, "Litenna In-Building RF Distribution System", 1998, pp. 1-8, Publisher: Foxcom Wireless.

"Digital Transport for Cellular", Feb. 1993.

Russell, "New Microcell Technology Sets Cellular Carriers Free", Telephony, Mar. 1993, pp. 40, 42, and 46.

Kobb, "Personal Wireless", IEEE Spectrum, Jun. 1993, pp. 20-25, Publisher: IEEE.

"Urban Microcell System Layout—Presentation", Jun. 14-18, 1992, Publisher: GTE Laboritories.

Zonemaster, "Maximum Coverage for High-Capacity Locations", 1993 Decibel Products, 1993, pp. 1-4, Publisher: Decibel Multi Media Microcell Sysetm.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 23-26, 1991, pp. 1171-1175, vol. 3, Publisher: IEEE.

* cited by examiner

SMALL SIGNAL THRESHOLD AND PROPORTIONAL GAIN DISTRIBUTED DIGITAL COMMUNICATIONS

CROSS REFERENCE TO RELATED APPLICATIONS

This application claims the benefit of U.S. Provisional Application No. 60/430,435 filed on Dec. 3, 2002.

This application is a continuation of U.S. patent application Ser. No. 10/414,907, filed on Apr. 16, 2003 and entitled "SMALL SIGNAL THRESHOLD AND PROPORTIONAL GAIN DISTRIBUTED DIGITAL COMMUNICATIONS" (the '907 Application). The '907 Application is incorporated herein by reference.

BACKGROUND

Various types of wireless communication systems have become prevalent around the world. For example, cellular communication systems cover most major metropolitan areas as well as major highways through remote areas. Cellular systems permit individuals with cellular handsets to communicate with base stations that are connected to the public switched telephone network (PSTN) or some other communication network.

As with any communication system, cellular systems can leave coverage "holes" where the signal from the base stations cannot reach. The holes can be in tunnels, valleys, city streets between tall buildings, or any other location where a radio frequency (RF) signal is blocked. Placing additional base stations where these coverage holes are located is not always an option. Base stations tend to be very expensive due not only to the cost of the equipment but also because of land acquisition costs. Additionally, large base station antennas may not fit within an area either physically or aesthetically. One solution to hole coverage is to use smaller distributed antennas where coverage is needed but a base station is not warranted or desired.

Any system has a certain dynamic range over which signals are processed. For a system that has only one antenna port, the entire dynamic range is available to the single port signal. When the system has multiple antenna ports, as in the distributed antenna system, the same dynamic range is shared amongst the aggregate signal from all the ports. This reduces the dynamic range available for each port when multiple ports are simultaneously active.

SUMMARY

The following specification addresses small signal threshold and proportional gain distributed digital communications. Particularly, in one embodiment, an apparatus for gain distribution in a system comprising a plurality of distributed antennas and a total system dynamic range is provided. The apparatus includes means for sensing a signal level at each of the plurality of distributed antennas, means for comparing at least one of the plurality of signal levels with a dynamic range fair share threshold, and means for attenuating each of the at least one of the compared signal levels that is greater than the dynamic range fair share threshold with a gain factor that is determined in response to a remaining portion of the total system dynamic range after attenuation of other signal levels of the plurality of signal levels.

DETAILED DESCRIPTION

By distributing signal attenuation and control of the attenuation, the embodiments described here retain the original system dynamic range. A signal level threshold prevents small but valid signals from being attenuated to the point of being useless while the unused dynamic range is redistributed to signals that require the additional dynamic range.

The embodiments described here refer to fiber optics as a communications medium between remote units and the host unit. However, the communications medium connecting the remote units to the host unit can take any form including a laser through an air interface, an RF signal over coaxial cable, or an RF signal through an air interface.

Figure 1:
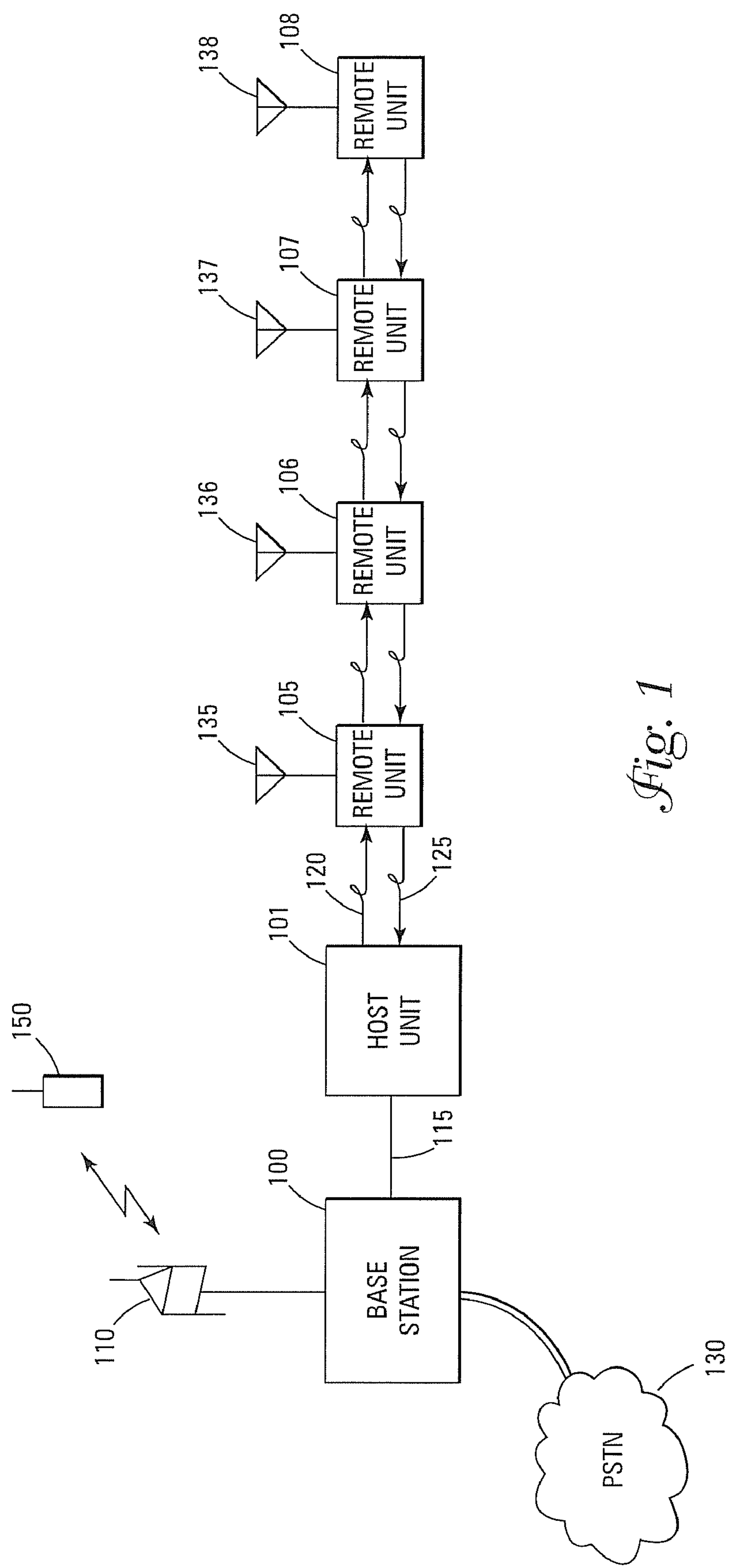
FIG. 1 shows a block diagram of an embodiment of a distributed digital antenna system.

FIG. 1 illustrates a block diagram of one embodiment of a distributed digital antenna system. The system has a base station (100) that communicates over an RF link using an antenna (110). The base station communicates over the RF link using any appropriate air interface standard. For example, the air interface standard comprises one of Advanced Mobile Phone System (AMPS), code division multiple access (CDMA), time division multiple access (TDMA), Global System for Mobile communications (GSM), or any other appropriate air interface standard.

The RF link is made up of a forward link over which the base station (100) transmits to a subscriber unit (150). The subscriber unit (150) transmits back to the base station (100) over a reverse link. The subscriber unit (150) is either a mobile station or a fixed station such as in a wireless local loop system.

The base station (100) has the transmitters and receivers that enable the subscriber unit (150) to communicate with the public switched telephone network (PSTN) (130). In one embodiment, the base station links the subscriber unit (150) to other subscriber units that are communicating with other base stations. In one embodiment, the base station (100) is connected to the PSTN through a mobile switching center that handles the switching of calls with multiple base stations.

A host unit (101) is connected to the base station (100) through an RF link (115). In one embodiment, this link (115) is a coaxial cable. Other embodiments use other types of connections such as an air interface or an optical fiber carrying digital RF signals. U.S. Pat. No. 6,704,545, assigned to ADC Telecommunications, Inc. and incorporated herein by reference, discloses digital RF signals.

The host unit (101) is responsible for converting the RF signal from the base station (100) to an optical signal for transmission over an optical medium. The host unit (101) also converts a received optical signal to an RF signal for transmission to the base station (100). In other embodiments, the host unit (101) performs additional functions.

One or more remote units (105-108) are connected to the host unit (101) through an optical medium, such as fiber optic lines (120 and 125), in a daisy-chain arrangement. The remote units (105-108) are placed in locations that require additional signal coverage due to a lack of coverage by the base station (100). The remote units (105-108) communicate with subscriber units in a particular remote unit's coverage area over an RF link provided by the remote unit antennas (135-138).

For purposes of illustration, four remote units (105-108) are shown. However, alternate embodiments use other quantities of remote units. If only a small geographic area requires coverage, as few as one remote unit (105) is used. If a highway in a remote area requires additional coverage, more than four remote units are typically used.

The embodiment of FIG. 1 uses a separate fiber optic line for each direction of communication. Each fiber carries a different wavelength. For example, the fiber optic line (120) from the host unit (101) to the remote units (105-108) carries a wavelength of $\lambda_1$. The fiber optic line (125) from the remote units (105-108) to the host unit (101) carries a wavelength of $\lambda_2$. In alternate embodiments, each fiber carries the same wavelength.

The fiber optic line (120) from the host unit (101) to the remote units (105-108) carries the digital optical signal for transmission by the remote units (105-108). The fiber optic line (125) from the remote units (105-108) carries a digital optical signal comprising the sum of the received signals from each of the remote units (105-108). The generation of this summation signal from the remote units is discussed subsequently.

Figure 2:
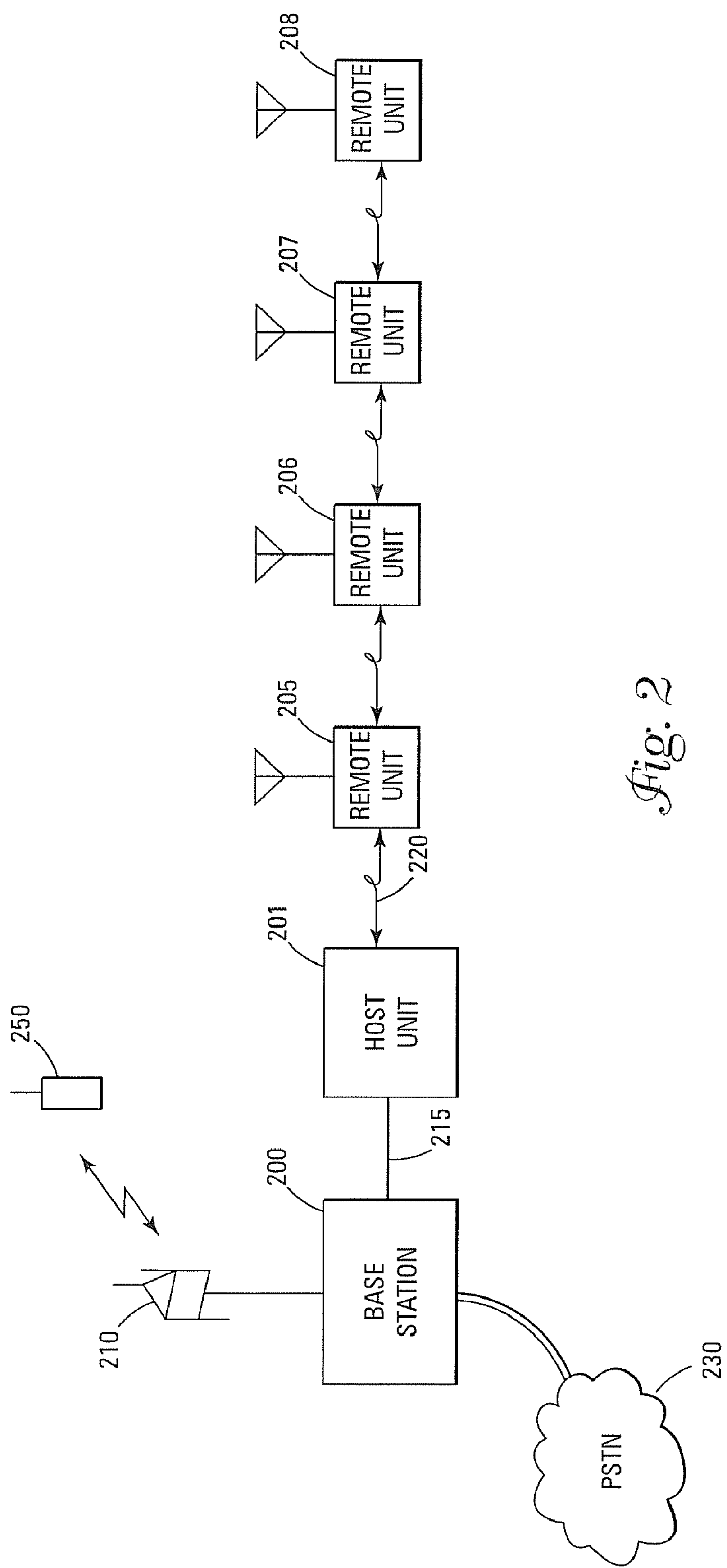
FIG. 2 shows a block diagram of another embodiment of a distributed digital antenna system.

FIG. 2 illustrates a block diagram of another embodiment of a distributed digital antenna system. This system is similar to the embodiment of FIG. 1 except that the remote units (205-208) are connected to the host unit (201) over a single optical medium (220).

The system of FIG. 2 has a base station (200) that communicates over an RF link using an antenna (210). The base station can communicate over the RF link using any air interface standard. For example, the air interface standard may be code division multiple access (CDMA), time division multiple access (TDMA), or Global System for Mobile communications (GSM).

The RF link is made up of a forward link over which the base station (200) transmits to a subscriber unit (250). The subscriber unit (250) transmits back to the base station (200) over a reverse link. The subscriber unit (250) may be a mobile station or a fixed station such as in a wireless local loop system.

The base station (200) has the transmitters and receivers that enable the subscriber unit (250) to communicate with the public switched telephone network (PSTN) (230). The base station may also link the subscriber unit (250) to other subscriber units that are communicating with other base stations. In one embodiment, the base station (200) is connected to the PSTN through a mobile switching center that handles the switching of calls with multiple base stations.

A host unit (201) is connected to the base station (200) through an RF link (215). In one embodiment, this link (215) is a coaxial cable. Other embodiments use other types of connections such as an air interface or an optical fiber carrying digital RF signals.

The host unit (201) is responsible for converting the RF signal from the base station (200) to a digital optical signal for transmission over an optical medium. The host unit (201) also converts a received optical signal to an RF signal for transmission to the base station (200). In other embodiments, the host unit (201) performs additional functions.

One or more remote units (205-208) are connected to the host unit (201) through an optical medium, such as a fiber optic line (220), that is connected in a daisy-chain arrangement. The remote units (205-208) are placed in locations that require additional signal coverage due to a lack of coverage by the base station (200).

For purposes of illustration, four remote units (205-208) are shown. However, alternate embodiments use other quantities of remote units depending on the application.

The embodiment of FIG. 2 uses a single fiber optic line (220) for communication both to and from the remote units (205-208). This is accomplished by the single fiber (220) carrying multiple wavelengths. For example, the fiber optic line (220) uses a wavelength of $\lambda_1$, for the digital signal from the host unit to the remote units (205-208). The fiber optic line (220) also carries a digital summation signal with a wavelength of $\lambda_2$. This digital summation signal is the sum of the received signals from the remote units (205-208). The generation of this summation signal from the remote units is discussed subsequently.

Figure 3:
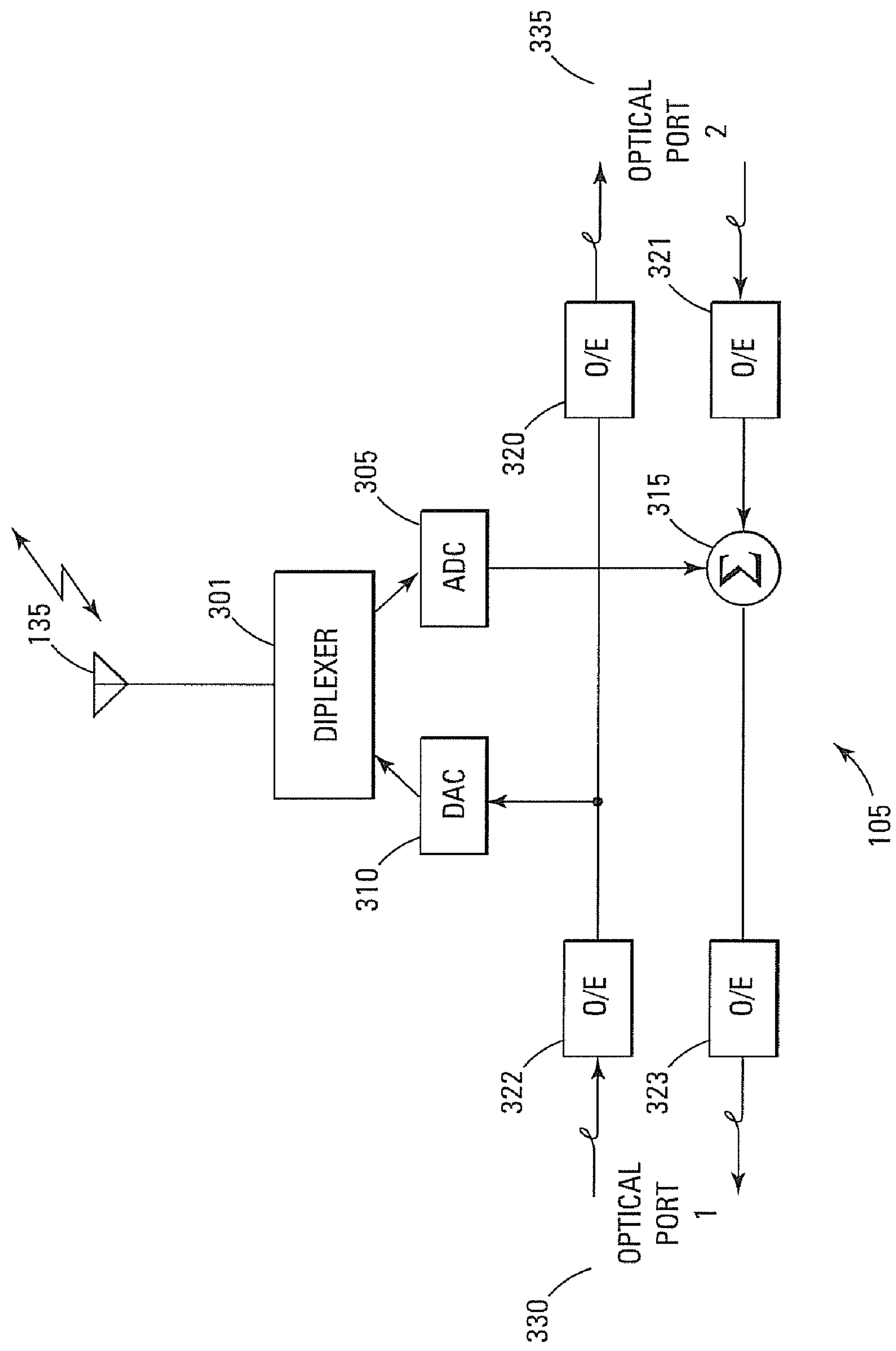
FIG. 3 shows a block diagram of an embodiment of a remote unit in accordance with the system of FIG. 1.

FIG. 3 illustrates a block diagram of one embodiment of a remote unit (105) of FIG. 1. Each of the remote units (105-108) of the embodiment of FIG. 1 are substantially identical in functional composition. The remote unit (105) transmits and receives RF communication signals over the antenna (135). Both the receive and transmit circuitry is connected to the antenna (135) through a diplexer (301). Alternate embodiments use other quantities of antennas. For example, one embodiment uses three antennas to cover three different sectors of an area. In other embodiments, diversity antennas are used.

An analog signal that is received on the antenna (135) is split off by the diplexer (301) to an analog-to-digital converter (305). The analog-to-digital converter (305) digitizes the received analog signal by periodically sampling the signal. The sampling generates a digital representation of the received analog signal. In one embodiment, the digital signal comprises 14 bit samples of the received analog signal.

The digitized received signal is input to a summer (315) to be added to the digitized signals from the preceding remote units in the daisy-chain. The input of the summer (315), therefore, is coupled to an output of a previous remote unit. The output of the summer (315) is a summation signal that is coupled to either the input of a subsequent remote unit or to the host unit. The host unit thus receives a summation signal that represents the sum of all the signals received by the remote units (105-108) of the system.

A digital signal from the host unit is coupled to a digital-to-analog converter (310). The digital-to-analog converter (310) takes the digital representation of an analog signal and converts it to the analog signal for transmission by the antenna (135).

Optical-to-Electrical converters (320-323) are located at the optical ports (330 and 335) of the remote unit (105). Each optical port (330 and 335) has an input and an output that are each coupled to an Optical-to-Electrical converter (320-323).

Since the remote unit (105) operates with electrical signals that are represented by the optical signals coming in through the optical ports (330 and 335), the Optical-to-Electrical converters (320-323) are responsible for converting the optical signals to electrical signals for processing by the remote unit (105). Received electrical signals are converted from electrical to an optical representation for transmission over the optical fiber.

Figure 4:
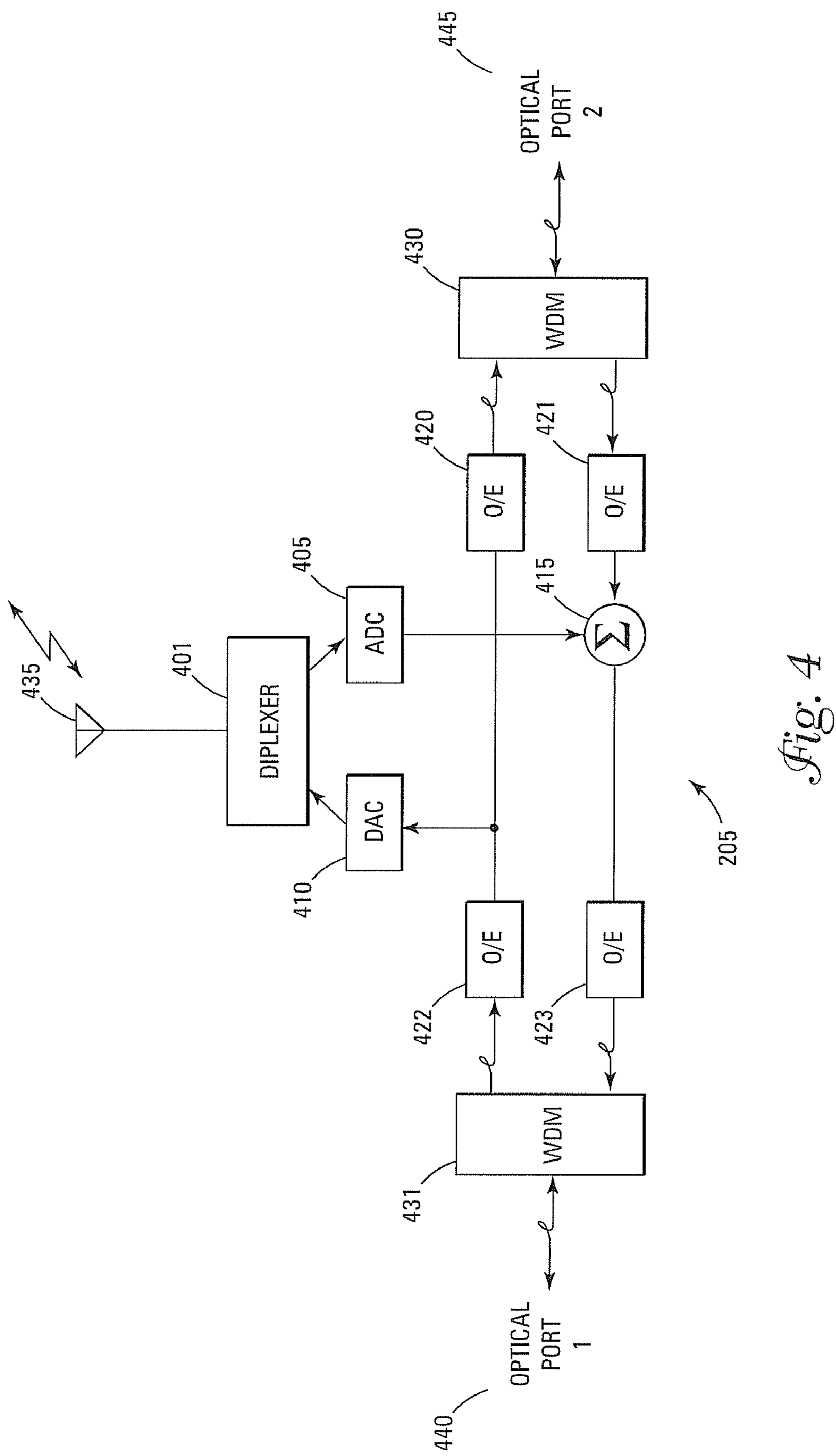
FIG. 4 shows a block diagram of an embodiment of a remote unit in accordance with the system of FIG. 2.

FIG. 4 illustrates a block diagram of one embodiment of a remote unit (205) of FIG. 2. Each of the remote units (205-208) of the embodiment of FIG. 1 is substantially identical in functional composition.

The remote unit (205) transmits and receives RF communication signals over the antenna (435). Both the receive and transmit circuitry are connected to the antenna (435) through a diplexer (401). Alternate embodiments use other quantities of antennas. For example, one embodiment uses three antennas to cover three different sectors of an area. In other embodiments, diversity antennas are used.

An analog signal that is received on the antenna (435) is split off by the diplexer (401) to an analog-to-digital converter (405). The analog-to-digital converter (405) digitizes the received analog signal by periodically sampling the signal. The sampling generates a digital representation of the received analog signal. In one embodiment, the digital signal comprises 14 bit samples of the received analog signal.

The digitized received signal is input to a summer (415) to be added to the digitized signals from the preceding remote units in the daisy-chain. The host unit thus receives a summation signal that represents the sum of all the signals received by the remote units (205-208) of the system.

A digital signal from the host unit is coupled to a digital-to-analog converter (410). The digital-to-analog converter (410) takes the digital representation of an analog signal and converts it to the analog signal for transmission by the antenna (435).

Optical-to-Electrical converters (420-423) are located at the optical ports (440 and 445) of the remote unit (205). Each optical port (440 and 445) has an input and an output that are each coupled to an Optical-to-Electrical converter (420-423).

Since the remote unit (205) operates with electrical signals that are represented by the optical signals coming in through the optical ports (440 and 445), the Optical-to-Electrical converters (420-423) are responsible for converting the optical signals to electrical signals for processing by the remote unit (205). Received electrical signals are converted from electrical to an optical representation for transmission over the optical fiber.

A wavelength division multiplexer (WDM) (430 and 431) is located at each optical port (440 and 445). The WDMs (430 and 431) perform the optical processing necessary to combine several optical signals having several wavelengths. The WDMs (430 and 431) also perform the optical demultiplexing necessary to split the multiple wavelengths of a single fiber to their own signal paths.

In the above-described embodiments, if one antenna port uses up all of the system's dynamic range, none is available for the other antenna ports and the aggregate dynamic range needs to be increased. The amount of additional dynamic range required (in dB) is expressed as 20Log N, where N is the number of antenna ports. The quantity of additional bits required in a frame in order to express the aggregate signal is expressed as $\mathrm{Log}_2 N$.

As an example of one embodiment of operation, the dynamic range for 14 bits is 84 dB. To accommodate the aggregate dynamic range for 32 antenna ports, an additional 30 dB and 5 bits are required. In this case, the analog-to-digital resolution for each port still remains at 14 bits but the summation of all the antenna port signals is represented by 19 bits.

In order to keep the original dynamic range and output signal levels, the distributed attenuation of the embodiments described here use attenuators at antenna port inputs, outputs, or both. The distributed control may use a head-end based controller with feedback to each antenna port, local controllers at each antenna port, or distributed control with distributed feedback.

The embodiments described here use automatic gain limiting (AGL) as a gain control function. Alternate embodiments use automatic gain control (AGC) as a gain control function. AGL is active only when the signal exceeds some maximum value. AGC continuously controls attenuation. The embodiments described here further employ different methods of attenuation. These methods include stepped attenuation, continuous attenuation, and fair and balanced attenuation.

Stepped attenuation is used when the summation of all of the antenna ports exceeds the maximum threshold. In one embodiment, this threshold is unity. In this case, the attenuator provides attenuation in discrete increments. For example, 6 dB increments can be accomplished in a binary number by bit shifting in the direction of a smaller value. One shift equals 6 dB, two shifts equals 12 dB, and three shifts equals 18 dB. This can be continued for as much attenuation as required. For 32 antenna ports, five shifts of 6 dB accommodate 30 dB of attenuation.

Continuous attenuation is continuous in value. The attenuation need not be in fixed steps but the attenuation could be accomplished with exactly as much as needed. In other words, the attenuation could be proportional to the excess aggregate signal level. If the aggregate signal is 2.3 dB above the maximum, the attenuator introduces exactly 2.3 dB of attenuation. This method of attenuation is accomplished by multiplying the aggregate value by the appropriate attenuation factor. In one embodiment, the attenuation factor is between 0, for infinite attenuation, and 1 for no attenuation.

Applying the attenuation to the aggregate signal means that all of the signals are treated the same. The smallest signals suffer the most. In fact, very small signals may be attenuated to a level below the least significant bit. At this point, such signals cease to exist.

Figure 10:
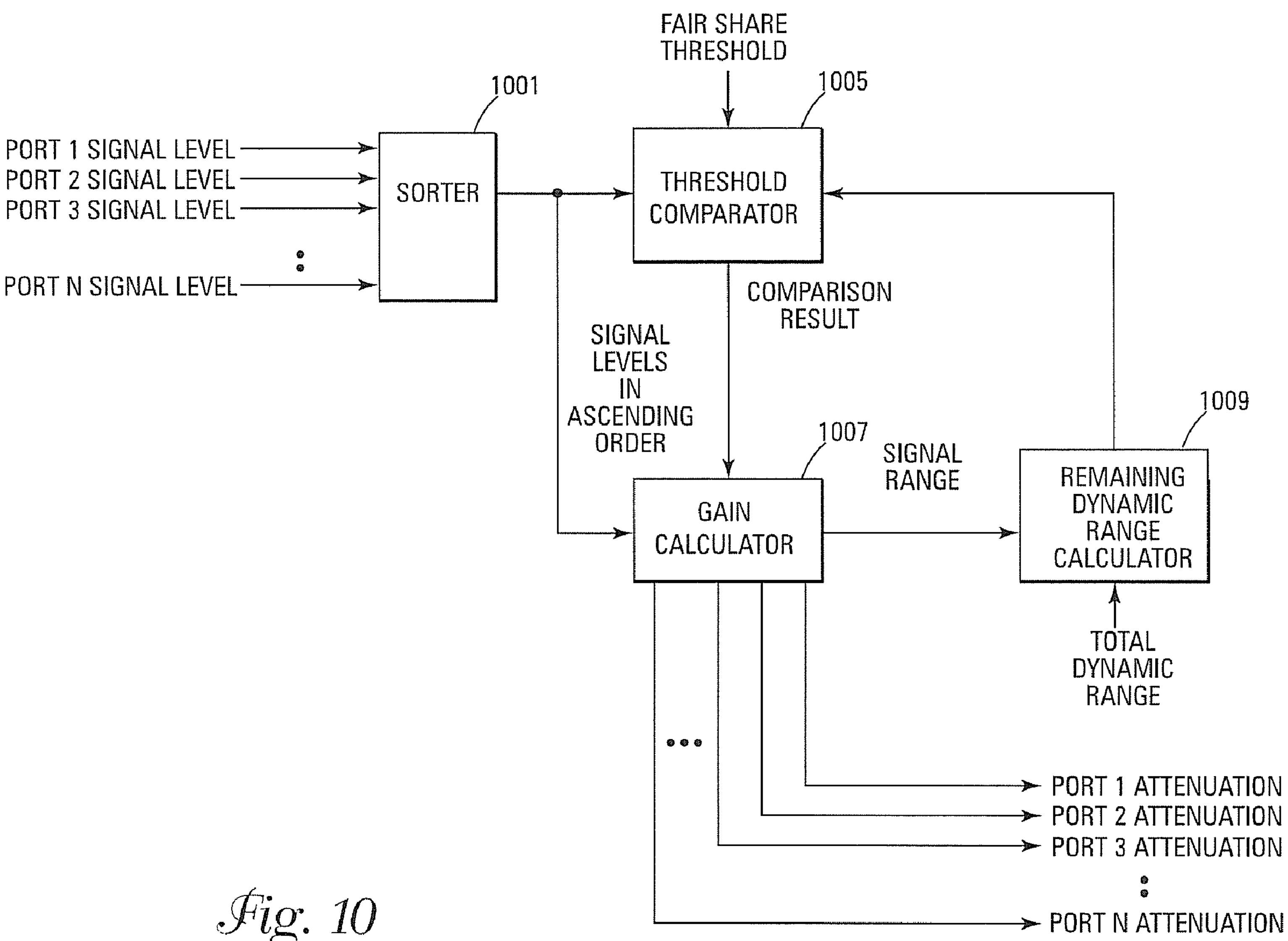
FIG. 10 shows a block diagram of an embodiment of a method for fair and balanced gain control in a distributed summation and gain control system.

A block diagram of the fair and balanced attenuation method is illustrated in FIG. 10. This method attenuates the smallest signals the least and the largest signals are attenuated the most. Some of the very small signals may not receive any attenuation. An additional benefit is that no portion of the dynamic range goes unused since it is progressively allocated to the larger signals. In one embodiment, the functions of FIG. 10 are accomplished in the digital domain.

Referring to FIG. 10, in order to perform the fair and balanced attenuation method, each individual antenna port input is sensed with a sampling function that is well known in the art to determine each input signal level. The signal levels are applied to the sorter (1001). The sorter (1001) sorts the antenna port signals, designated $x_j$, in ascending order according to their level. In this case, j=1 is the smallest and j=N is the largest, where N is the number of antenna ports. The sorted signals are input to a threshold comparator (1005) and a gain calculator (1007). A "fair share" threshold is also input to the threshold comparator. The dynamic range fair share threshold, K, is calculated as $K=T/(n-j)$ where the total available system dynamic range is unity and is designated as T. In alternate embodiments, other appropriate threshold calculations are used.

The fair share threshold is dynamically redefined in order to divide any remaining dynamic range among the remaining signals. The total remaining system dynamic range is calculated by a remaining dynamic range calculator (1009) that is also input to the threshold comparator (1 005). The remaining dynamic range calculator (1009) uses the signal range input from the gain calculator (1007) and the total dynamic range that is assumed to be unity in this embodiment. The total remaining dynamic range is expressed as $T=T-y_i$ where $y_i$ is the output signal from the antenna port. Alternate embodiments use other total dynamic ranges.

The gain calculator generates a gain, $G_j$, from the threshold comparison results in order to progressively generate gain factors for Port 1-Port N in ascending order. The process of FIG. 10 can be expressed as:

| | |
|---|---|
| if $x_j \leqq K$, then | Input signal, $x_j$, is less than fair share |
| do for j=1 to N | |
| $G_j = 1$ | |
| $y_j = G_j * x_j$ | |
| $T = T - y_j$ | |
| $K = T/(N-j)$ | |
| end do | |
| else | Remaining input signals are more than fair share |
| $G_j = K/x_j$ | Gain is inverse to signal level input |
| $y_j = G_j * x_j$ | Reduce level proportionally |
| end if | |

The fair and balanced attenuation embodiment of FIG. 10 is illustrated below in Table 1 using continuous attenuation:

TABLE 1

| Index j | Input $x_j$ | Fair Share K | Gain $G_j$ | Output $y_j$ | Remaining Dynamic Range T | Number of Remaining Signals |
|---|---|---|---|---|---|---|
| | | | | | 1 | 4 |
| 1 | 0.1 | 0.25 | 1 | 0.1 | 0.9 | 3 |
| 2 | 0.3 | 0.3 | 1 | 0.3 | 0.5 | 2 |
| 3 | 0.4 | 0.3 | 0.75 | 0.3 | 0.3 | 1 |
| 4 | 0.5 | 0.3 | 0.6 | 0.3 | 0 | 0 |

It can be seen in Table 1 above that the smallest signal (e.g., $x_j=0.1$) remains unchanged. It has been attenuated with a unity gain factor. The next smallest signal (e.g., $x_j=0.3$) takes advantage of the dynamic range that is not used by the first signal. This signal is also attenuated with a unity gain factor. The next largest signal (e.g., $x_j=0.4$) is attenuated by a gain factor of 0.75. The largest signal (e.g., $x_j=0.5$) is attenuated the most by a gain factor of 0.6.

The process of FIG. 10 can also be applied to a stepped attenuation embodiment. Table 2 below illustrates such an embodiment. It should be noted that the 6 db steps are for illustration purposes only and the present invention is not limited to any one attenuation increment.

TABLE 2

| Index j | Input $X_j$ | Fair Share K | Gain $G_j$ | Output $Y_j$ | Remaining Dynamic Range T | Number of Remaining Signals |
|---|---|---|---|---|---|---|
| | | | | | 1 | 4 |
| 1 | 0.1 | 0.25 | 1 | 0.1 | 0.9 | 3 |
| 2 | 0.3 | 0.3 | 1 | 0.3 | 0.6 | 2 |
| 3 | 0.4 | 0.3 | 0.5 | 0.2 | 0.4 | 1 |
| 4 | 0.5 | 0.3 | 0.5 | 0.25 | 0.15 | 0 |

Table 2 above shows that the smallest signal remains unchanged since it is attenuated with a unity gain factor. The next smallest signal takes advantage of the dynamic range not used by the first signal. This signal also is attenuated with a unity gain factor. The next largest signal is attenuated by a gain factor of 0.5. This is a 6 dB step. Similarly, the largest signal is attenuated by a gain factor of 0.5. In this embodiment, a portion (e.g., 0.15) of the dynamic range is not used.

The following embodiments discuss certain transport path and aggregate signal levels (e.g., 14 bits). This is for illustration purposes only. The embodiments described here are not limited to any one transport path size or aggregate signal level.

Figure 11:
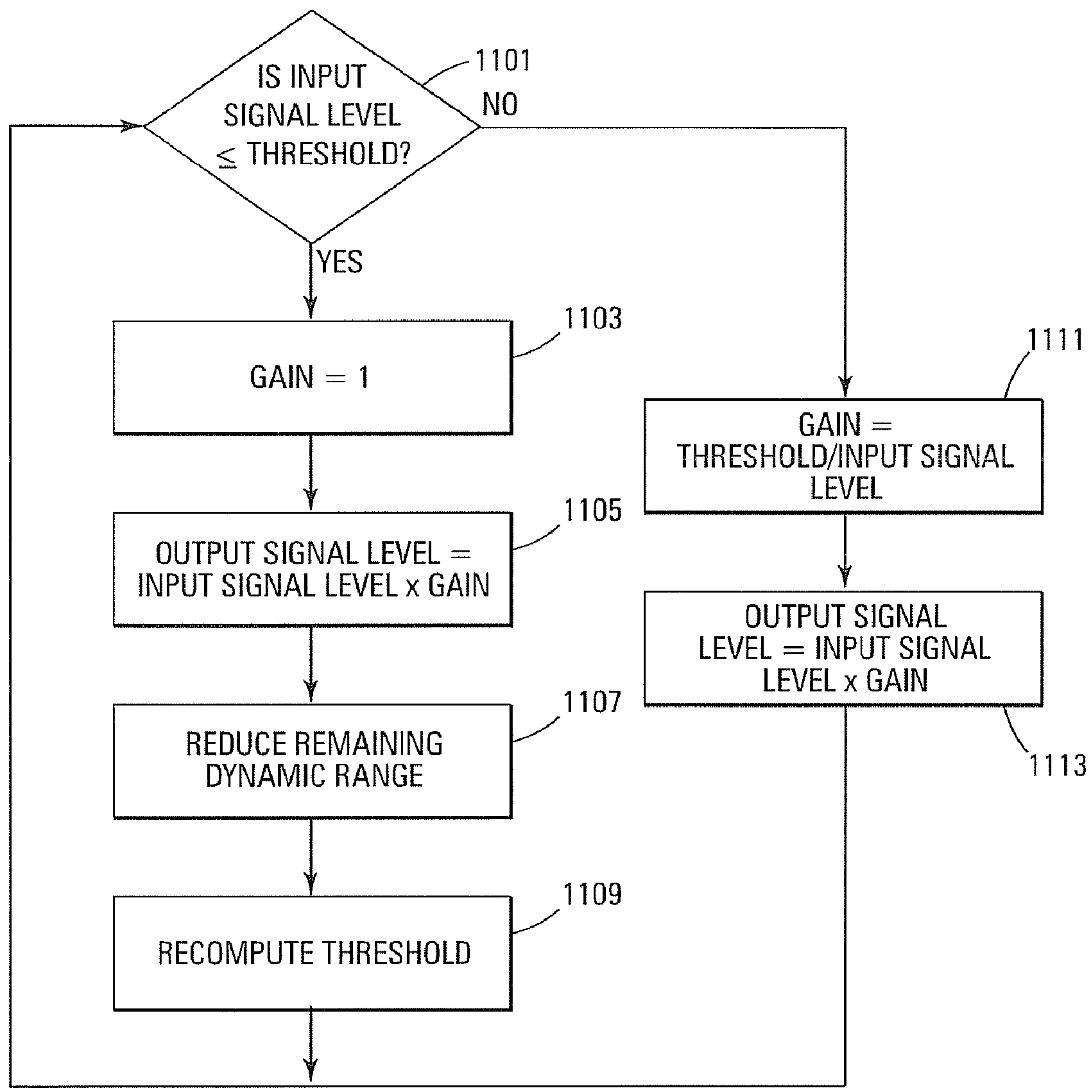
FIG. 11 shows a flowchart of an embodiment of the fair and balanced attenuation method of FIG. 10.

FIG. 11 illustrates a flowchart of one embodiment of the fair and balanced attenuation method described here. The method begins with determining if the input signal level is less than or equal to the threshold, K (1101). If they are not equal, the gain is determined to be the threshold divided by the input signal level (1111). The output signal level is then equal to the input signal level times the gain (1113). If the input signal level is less than or equal to the threshold (1101), the gain is set equal to one (1103). The output signal level is then computed to be the input signal level times the gain (1105). The remaining dynamic range is then reduced by the computed output signal level (1107). The threshold is also recomputed as the remaining dynamic range divided by the number of ports remaining (1109).

Figure 5:
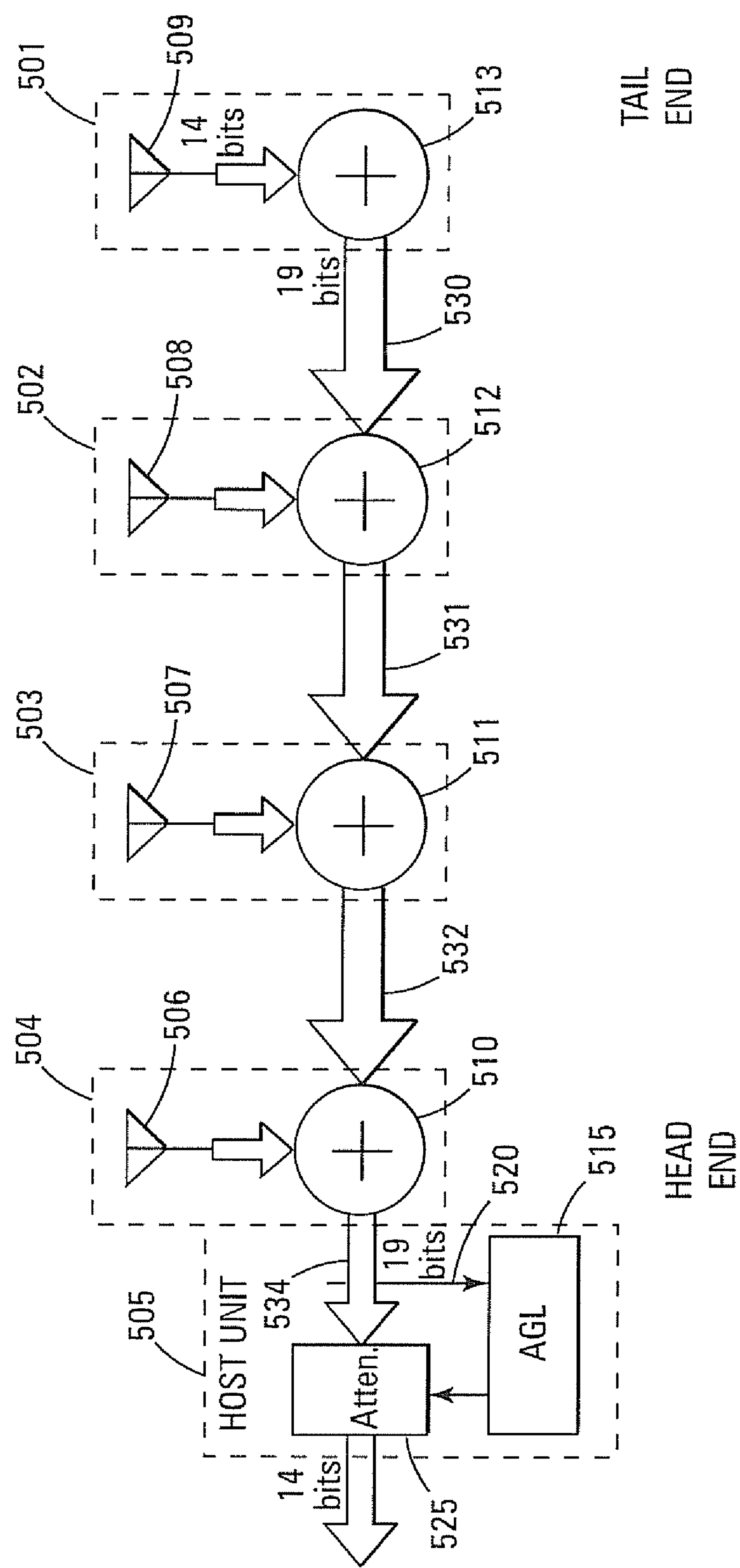
FIG. 5 shows a block diagram of an embodiment of a system having distributed summation and gain control with head end common attenuation.

FIG. 5 illustrates a block diagram of one embodiment of a system having distributed summation with head end common attenuation and gain control. For purposes of clarity, a functional equivalent of the above-described remote unit, in this and subsequent embodiments, is illustrated as an antenna (509) with a summation symbol (513).

The embodiment of FIG. 5 includes the four remote units (501-504) and the host unit (505) as described previously. Each remote unit (501-504) has an antenna (506-509) that receives RF signals that are digitized and summed (510-513) with any previous remote unit signals. The summations (510-513) and transport path (530-532) to each remote unit should have sufficient dynamic range to deliver the aggregate dynamic range. For example, in one embodiment the full dynamic range is 19 bits for 32 antenna ports. This embodiment assumes that all of the remote units are substantially identical.

In the embodiment of FIG. 5, the host unit (505), located at the head end, performs the AGL (515) and attenuation (525) functions. The AGL sampling function (515) samples (520) the aggregate signal (534) from the last remote unit (504) before the host unit (505). This signal requires 19 bits for a dynamic range of 114 dB. Other embodiments have other bit quantities to represent different dynamic ranges.

If the AGL function (515) determines that the aggregate signal (531) is greater than the maximum allowable dynamic range, the AGL function (515) instructs the attenuation function (525) to attenuate the signal. The attenuation function (525) may use the stepped attenuation, the continuous attenuation, or other attenuation approaches.

In the example illustrated in FIG. 5 where the aggregate signal is 19 bits, the attenuation function attenuates the signal to 14 bits. Thus, the signal from the host unit (505) to a base station will be within the allowable dynamic range.

Figure 6:
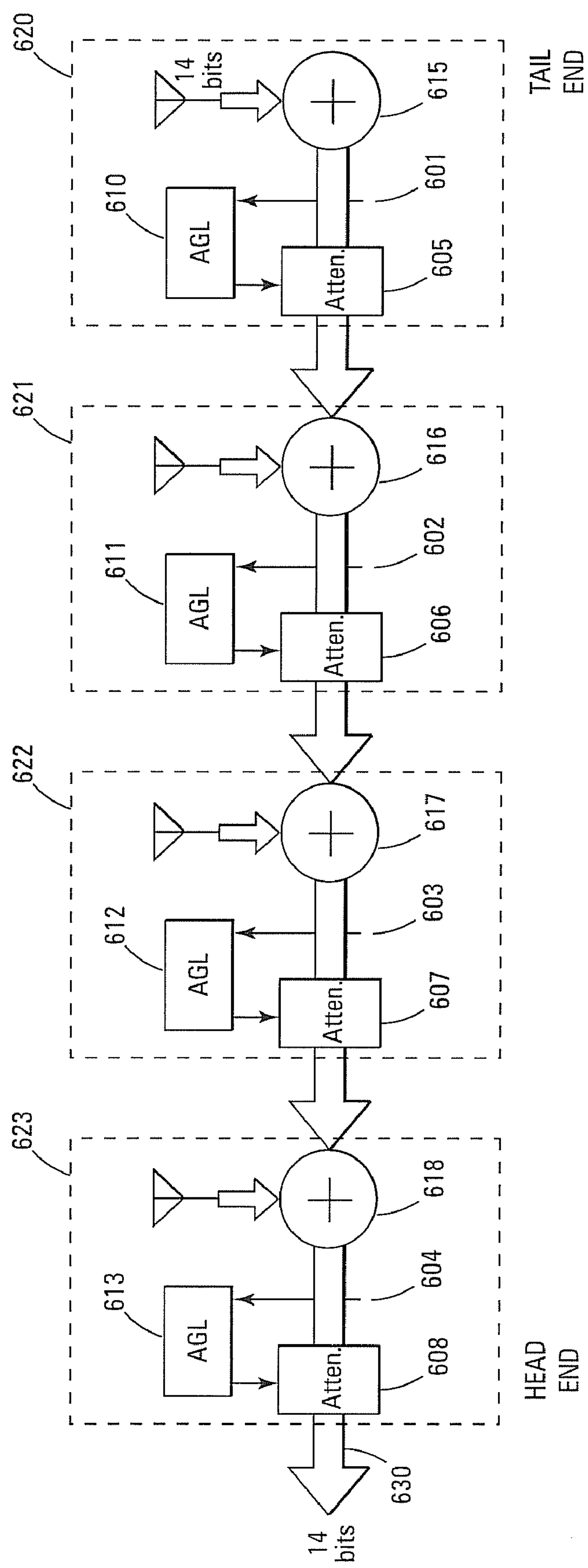
FIG. 6 shows a block diagram of an embodiment of a system having distributed summation and gain control with localized common attenuation.

FIG. 6 illustrates a block diagram of one embodiment of a system having distributed summation and gain control with localized common attenuation. This embodiment uses a standard transport path (601-604) (e.g., 14 bits) by applying localized attenuation to its aggregate signal.

Each remote unit (620-623) attenuates its common output level so that the maximum level is not exceeded. The aggregate of all summations (615-618) and attenuations (605-608) results in a head end aggregate signal (630) that does not exceed the maximum level.

The AGL function (610-613) of each remote unit (620-623) samples the signal level output (601-604) from the respective summation (615-618). If the signal level is greater than the allowable dynamic range, the AGL function (610-613) instructs its respective attenuation function (605-608) to attenuate that particular signal.

Figure 7:
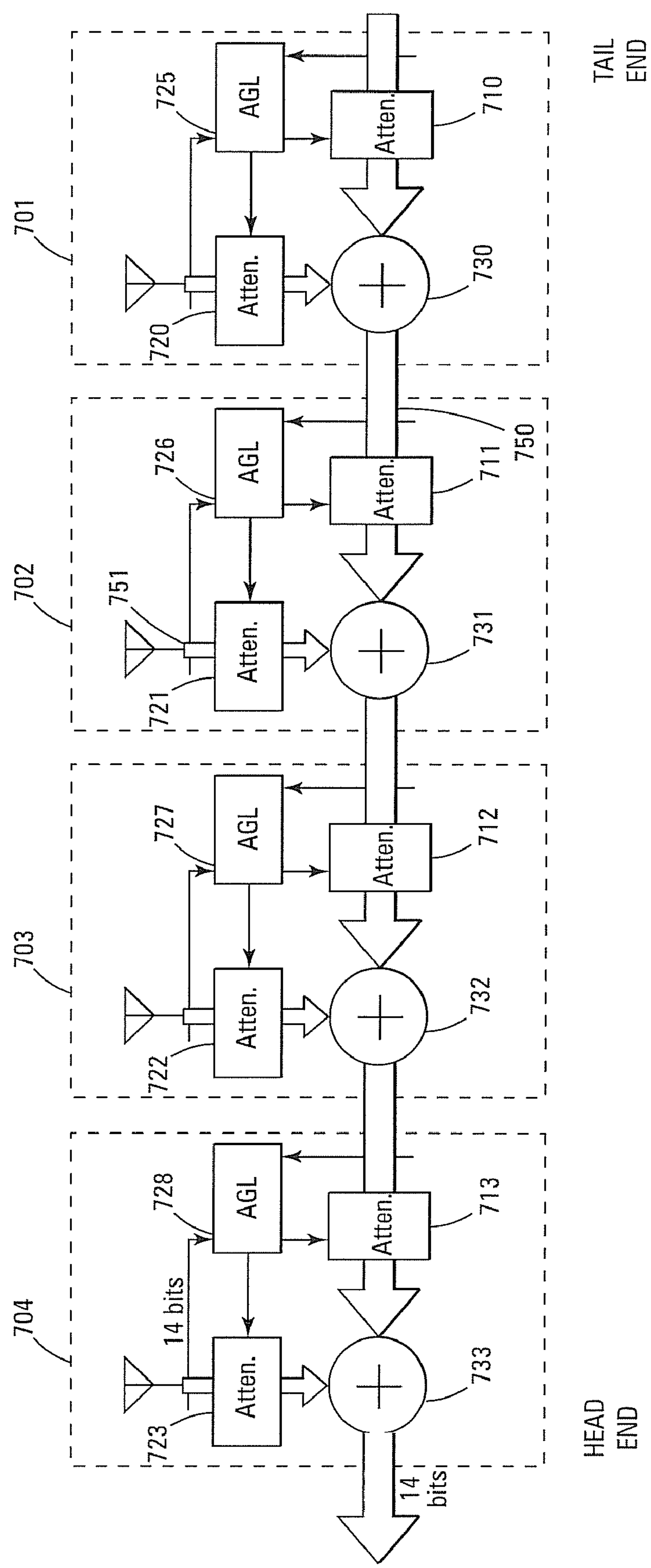
FIG. 7 shows a block diagram of an embodiment of a system having distributed summation and gain control with localized input attenuation.

FIG. 7 illustrates a block diagram of one embodiment of a system having distributed summation and gain control with localized input attenuation. In this embodiment, each of the remote units (701-704) uses an AGL function (725-728) to control attenuation functions (710-713 and 720-723) on the summation (730-733) inputs.

The input signals that are attenuated in this embodiment include both the antenna port and the downstream port. For example, in one remote unit (702) the AGL function (726) samples the downstream signal path (750) and the antenna port input (751). If the dynamic range of either input is greater than the allowable maximum, the AGL function (726) instructs the attenuation function (711 and/or 721) of the appropriate input to attenuate that particular signal.

The fair and balanced attenuation method can be employed in the embodiment of FIG. 7 as illustrated in FIGS. 10 and 11. However, this embodiment is not limited to any one attenuation method.

Figure 8:
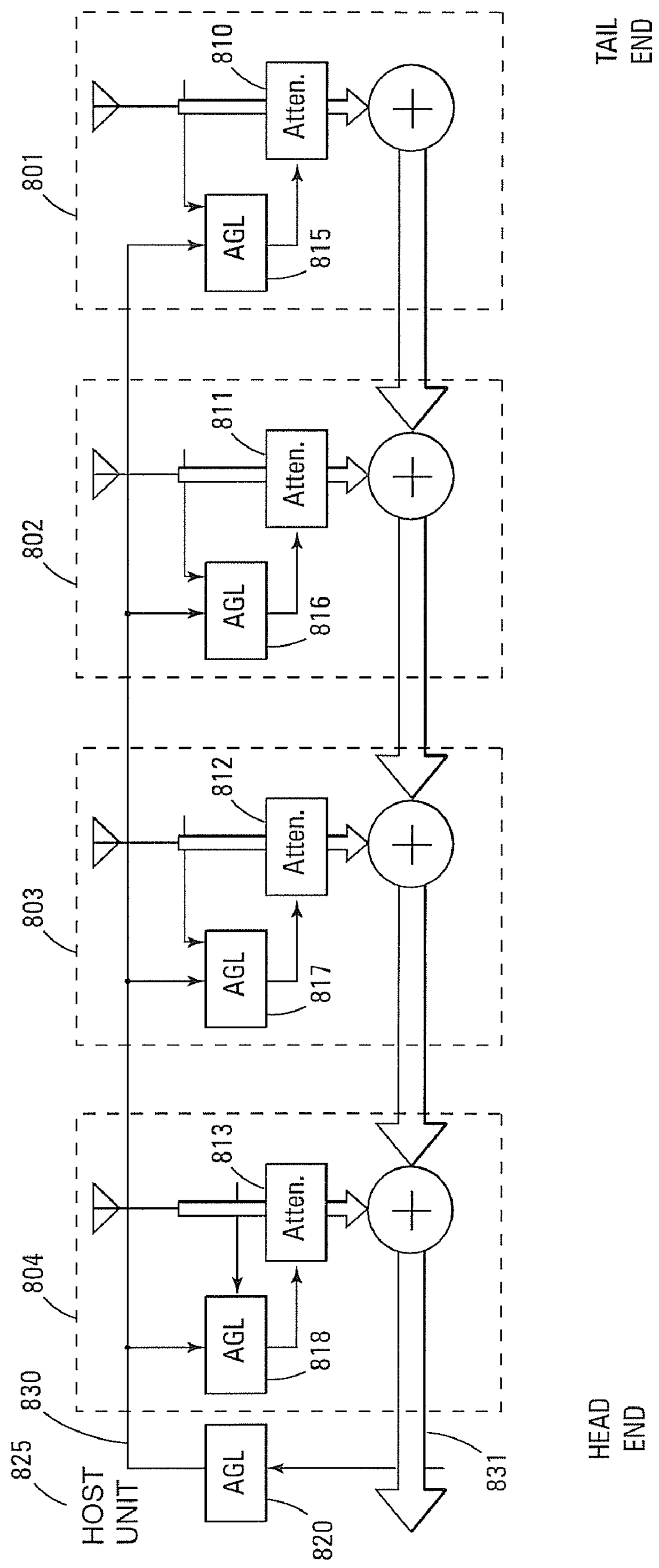
FIG. 8 shows a block diagram of an embodiment of a system having distributed summation and gain control with head end common attenuation.

FIG. 8 illustrates a block diagram of one embodiment of a system having distributed summation and gain control with head end controlled, distributed attenuation. This embodiment uses an AGL function (820) at the host unit (825) to provide feedback (830) to the remote units (801-804).

Each remote unit (801-804) has an attenuation function (810-813) at the antenna port to provide appropriate attenuation to the input signal. An AGL function (815-818) samples the antenna port's received signal in order to provide individual attenuation instructions to the attenuation functions (810-813).

The embodiment of FIG. 8 additionally uses an AGL function (820) at the host unit (825) to sample the final aggregate signal (831). The host unit's AGL function (820) provides a head end feedback attenuation signal (830) to the remote units' AGL functions (815-818) to use in conjunction with the sampled input communication signal levels. This feedback signal (830) may take the form of one or more bits in the data being transmitted along the optical medium to the remote units (801-804) from the host unit (825).

For the case of continuous attenuation, the feedback attenuation signal is an attenuation factor that is comprised of a value between 0 and 1. For example, an unattenuated aggregate of 2 would be represented by an attenuation factor of 0.5. The attenuation factor is not applied directly to the individual remote units' attenuation functions (810-813). Instead, if a port signal is more than 0.5 of the total dynamic range, the remote units' AGL function (815-818) instructs the appropriate attenuation function (810-813) to apply a 0.5 attenuation factor to the port input. If the signal is equal to or less than 0.5, attenuation is not applied.

Since some of the signals may not be attenuated, the resulting aggregate signal may still be slightly too high. In this case, the AGL function (820) at the host unit (825) adjusts its feedback attenuation factor to whatever value is needed (e.g., 0.4). This value is dynamic and is lowered until the desired aggregate signal level is achieved.

Using the continuous attenuation method, the host unit's AGL function (820) samples the final aggregate signal (831) from the remote unit (804) nearest the head end. If the level of the final aggregate signal (831) is too large, the host unit (825) provides a feedback attenuation factor that starts at one and slews down toward zero. When the final aggregate signal level is within bounds (i.e., less than the maximum dynamic range), the host unit holds this attenuation factor.

If the final aggregate signal level later decreases sufficiently, the host unit (825) slowly raises the attenuation factor back toward one. All of the remote units (801-804) apply attenuation only to their own ports according to the fair and balanced attenuation method discussed previously. This means that the applied attenuation depends on the respective antenna port's input level as well as the feedback factor (830).

Using the stepped attenuation method, the host unit (825) samples the final aggregate signal (831) from the remote unit (804) nearest the head end. If the final aggregate signal (831) is too large, the host unit (825) provides a feedback attenuation signal that is an attenuation number that starts at 0 and increments towards 6. This is assuming 6 dB steps. Other embodiments use other increments.

When the final aggregate signal level is less than or equal to 0 dB (unity gain), the host unit's AGL function (820) holds this number. If the final aggregate signal level decreases to a predetermined level (e.g., −12 dB), the host unit decrements the number back towards 0. The decrementing occurs after a delay due to system end-to-end response.

In one embodiment, all of the remote units (801-804) apply attenuation to their own ports according to the fair and balanced attenuation method discussed previously. This means that the applied attenuation depends on the respective antenna port's input level as well as the feedback number. Table 3 below illustrates one example of the stepped fair attenuation as applied to the embodiment of FIG. 8:

TABLE 3

| | | Actual Applied Attenuation Port Signal Level | | | | |
|---|---|---|---|---|---|---|
| Step Number | Max Possible Attenuation | >−6 dB | >−12 dB | >−18 dB | >−24 dB | >−30 dB |
| 0 | 0 dB | 0 | 0 | 0 | 0 | 0 |
| 1 | 6 dB | −6 | 0 | 0 | 0 | 0 |
| 2 | 12 dB | −12 | −6 | 0 | 0 | 0 |
| 3 | 18 dB | −18 | −12 | −6 | 0 | 0 |
| 4 | 24 dB | −24 | −18 | −12 | −6 | 0 |
| 5 | 30 dB | −30 | −24 | −18 | −12 | −6 |

It can be seen in Table 3 above that a remote unit's attenuation only affects its port signals. There is a 12 dB window between the decision to increase attenuation and the decision to decrease attenuation. If all ports have the same signal level, a step increment affects them all and causes 6 dB more attenuation in both the individual and aggregate signal levels. But if some of the signals are of different levels, only the largest signals are attenuated by 6 dB. This results in an aggregate additional level attenuation that is less than 6 dB.

Figure 9:
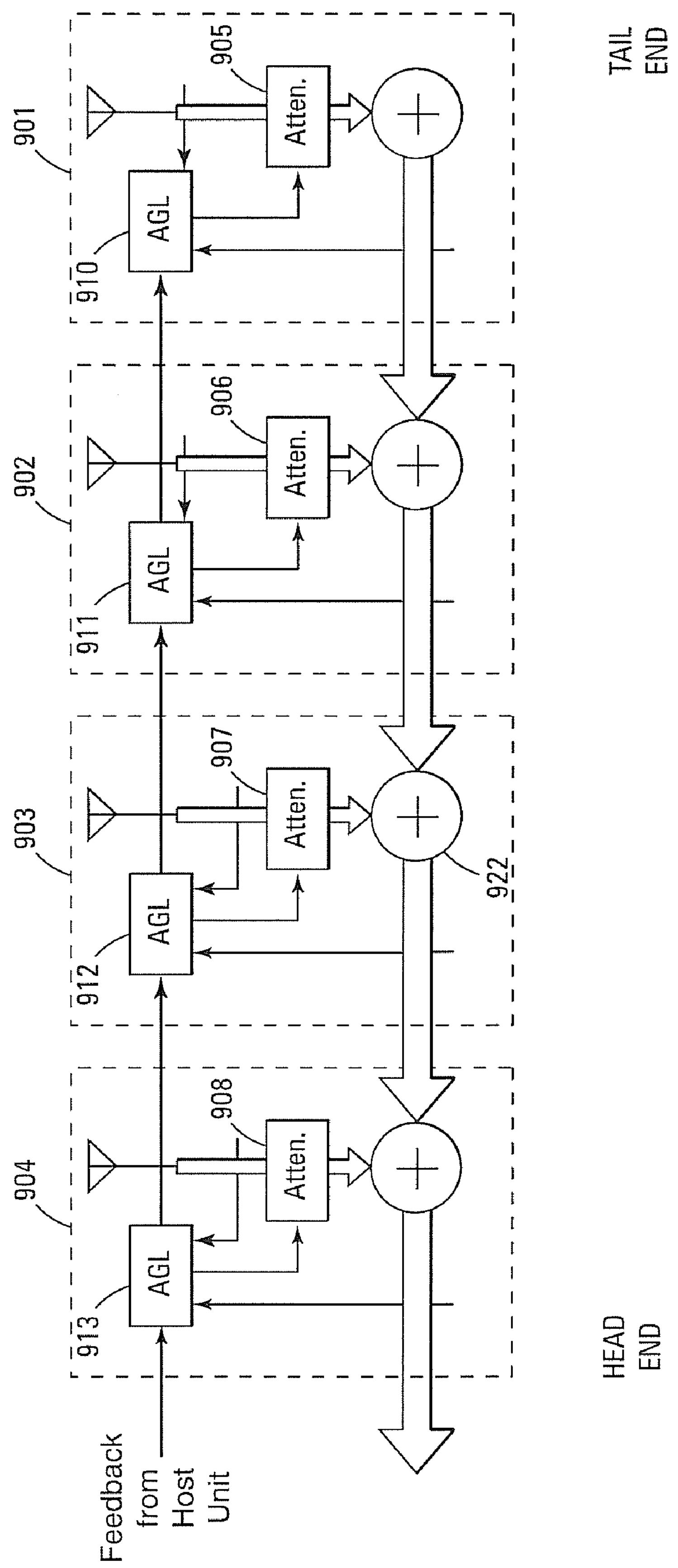
FIG. 9 shows a block diagram of an embodiment of a system having distributed summation and gain control with head end common attenuation.

FIG. 9 illustrates a block diagram of one embodiment of a system having distributed summation and gain control. This embodiment puts the attenuation decision making with the individual remote units (901-904) while still providing the feedback of the attenuation factor.

In this embodiment, the final aggregate signal is sampled and a feedback attenuation factor is passed toward the tail end of the system. The feedback can be accomplished by embedding the attenuation factor in a data frame that is transmitted over the communication medium to the remote units. The data frame format and use is well known in the art and not discussed further. In other embodiments, dedicated bits or a continuous value are used for the feedback.

Similarly, the AGL function (910-913) of each remote unit (901-904) also samples the aggregate signal at the output of the summation (920-923) for that particular unit. The sampling AGL function then passes an attenuation factor to the preceding remote unit's AGL function (910-913) in a data frame.

As an example, the AGL function (913) of the head end remote unit (904) samples the final aggregate signal level and generates an attenuation factor. This factor is fed back in the direction of the tail end to the next remote unit (903) in the daisy-chain. This remote unit (903) samples the signal level out of the summation (922) at that unit and generates an attenuation factor based on that level. This factor is fed back to the next remote unit (902) in the daisy-chain.

Every remote units' (901-904) AGL function (910-913) has two attenuation factors: the one from its local evaluation of its antenna port (i.e., the local attenuation signal) and the one from the upstream unit (i.e., towards the head end). The AGL function (910-913) applies the more severe factor of the two to its port attenuation and passes this factor on toward the tail end.

In this embodiment, the host unit generates the highest attenuation factor because its aggregate signal is the largest. Because of the feedback, all remote units use this factor to apply attenuation. Since all of the remote units also sample their own antenna port, they will apply no attenuation or little attenuation to sufficiently small signals. The remote units will also apply large attenuation to large signals.

If there is a break in the feedback path, the aggregate sampling at each remote unit prevents any unit's aggregate signal from overflowing. Furthermore, all units from the tail end to the point of the break will perform fair sharing of the aggregate signals amongst themselves. Similarly, all units from the break to the head end will perform fair sharing of the aggregate signals amongst themselves. However, the tail end group is favored over the head end group.

Numerous modifications and variations described here are possible in light of the above teachings. It is therefore to be understood that within the scope of the appended claims, the invention may be practiced otherwise than as specifically described herein.

What is claimed is:

1. An apparatus for gain distribution in a system comprising a plurality of distributed antennas and a total system dynamic range, the apparatus comprising:

means for sensing a signal level at each of the plurality of distributed antennas;

means for comparing at least one of the plurality of signal levels with a dynamic range fair share threshold; and means for attenuating each of the at least one of the compared signal levels that is greater than the dynamic range fair share threshold with a gain factor that is determined in response to a remaining portion of the total system dynamic range after attenuation of other signal levels of the plurality of signal levels.

2. The apparatus of claim 1, wherein the dynamic range fair share threshold is initially determined by an inverse of a quantity of the plurality of distributed antennas.

3. The apparatus of claim 1, and further including:

means for sorting the sensed signal levels in an ascending order coupled between the means for sensing and the means for comparing; and means for updating the total system dynamic range, after attenuation of each signal level, for allocating unused total system dynamic range to subsequently attenuated signal levels.

4. The apparatus of claim 1, wherein the means for attenuating further Include generating unity gain signal levels that are less than or equal to the dynamic range fair share threshold.

5. The apparatus of claim 1, wherein if the signal level is greater than the Dynamic range fair share threshold, the gain factor applied to a first signal level is Inversely proportional to the first signal level.

6. The apparatus of claim 5, wherein the gain factor that is substantially equal to the inverse of the first signal level is equal to a quantity of distributed antennas in the distributed antenna system divided by the first signal level.

7. A circuit for gain distribution in a distributed antenna system having a system dynamic range, the circuit comprising:

means for sorting, in ascending order, a plurality of signal levels from the distributed antenna system;

means, responsive to the means for sorting, for comparing a first signal level of the plurality of sorted signal levels with a dynamic range fair share threshold; and means, responsive to the means for comparing, for attenuating each of the at least one of the compared signal levels that is greater than the dynamic range fair share threshold with a gain factor that is determined in response to a remaining portion of the total system dynamic range after attenuation of other signal levels of the plurality of signal levels.

8. The circuit of claim 7, wherein the means for sorting include a sorter.

9. The circuit of claim 7, wherein the means for comparing include a threshold comparator.

10. The circuit of claim 7, wherein the means for attenuating include:

a gain calculator; and a remaining dynamic range calculator.

11. A method for operating a distributed antenna system having gain distribution and a total dynamic range, the method comprising:

receiving signals at one or more controllers within a distributed antenna system having gain distribution and a total dynamic range, each of the signals having a signal level;

sensing each signal level with a signal level sampling function in each of the one or more controllers;

generating comparison results at each of the one or more controllers in response to a comparison between a sorted signal and a dynamic range fair share threshold;

generating a remaining system dynamic range at each of the one or more controllers by decreasing the total dynamic range by each attenuated signal level; and progressively generating a gain factor at each of the one or more controllers for each received signal in ascending order in response to each comparison result.

12. The method of claim 11, further comprising converting each received signal at each of the one or more controllers to a digital signal having a signal level expressed in a digital format.

13. The method of claim 11, further comprising sorting the received signals at each of the one or more controllers in ascending order in response to each signal level.

14. The method of claim 11, further comprising updating the dynamic range fair share threshold at each of the one or more controllers with the remaining system dynamic range.

15. The method of claim 11, further comprising comparing a first digital signal level of the received signals at each of the one or more controllers with the dynamic range fair share threshold.

16. The method of claim 15, further comprising applying a unity gain factor to the first digital signal level at each of the one or more controllers if the first digital signal level is less than or equal to the dynamic range fair share threshold.

17. The method of claim 16, further comprising updating the dynamic range fair share threshold to allocate the remaining system dynamic range between remaining digital signal levels at each of the one or more controllers if the unity gain factor has been applied to the first digital signal level.

18. The method of claim 17, further comprising applying a first gain factor that is substantially equal to the dynamic range fair share threshold divided by the first digital signal level if the first digital signal level at each of the one or more controllers is greater than the dynamic range fair share threshold.

19. The method of claim 11, further comprising generating the gain factors at each of the one or more controllers in discrete increments.

20. The method of claim 11, further comprising attenuating each received signal at each of the one or more controllers in response to a corresponding gain factor.

* * * * *